(12) United States Patent
Sato (10) Patent No.: US 6,257,770 B1
(45) Date of Patent: Jul. 10, 2001

(54) OPTICAL CONNECTOR AND METHOD OF MANUFACTURING THE SAME

(75) Inventor: Yuji Sato, Iwate (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/208,470

(22) Filed: Dec. 10, 1998

(30) Foreign Application Priority Data

Dec. 19, 1997 (JP) .................................................. 9-350312

(51) Int. Cl.⁷ .............................. G02B 6/38; G02B 6/36
(52) U.S. Cl. ................................ 385/78; 385/89; 385/71
(58) Field of Search .................................. 385/78, 89, 71, 385/114

(56) References Cited

U.S. PATENT DOCUMENTS

| | | | |
|---|---|---|---|
| 5,815,621 | * | 9/1998 | Sakai et al. .................... 385/80 |
| 5,862,281 | * | 1/1999 | Shahid .......................... 385/78 |

FOREIGN PATENT DOCUMENTS

| | | |
|---|---|---|
| 62-276513 | 12/1987 | (JP) . |
| 62-276514 | 12/1987 | (JP) . |
| 63-246707 | 10/1988 | (JP) . |
| 3-179405 | 8/1991 | (JP) . |
| 3-179406 | 8/1991 | (JP) . |
| 5-34550 | 2/1993 | (JP) . |
| 8-334651 | 12/1996 | (JP) . |

* cited by examiner

Primary Examiner—Robert H. Kim
Assistant Examiner—Michael P. Stafira
(74) Attorney, Agent, or Firm—McGinn & Gibb, PLLC (57) ABSTRACT

An optical connector includes a resin core pin guide member, a molded resin, and at least one optical fiber hole. The core pin guide member guides a distal end portion of an optical fiber. The molded resin molds the core pin guide member while exposing one end face thereof, thus constituting a ferrule main body attached to the distal end portion of the optical fiber. The one end face of the core pin guide member is flush with a distal end face of the ferrule main body. The optical fiber guide hole has an inner wall constituted by the core pin guide member and the molded resin. The distal end portion of the optical fiber is inserted in the optical fiber guide hole. A method of manufacturing an optical connector is also disclosed.

22 Claims, 7 Drawing Sheets

OPTICAL CONNECTOR AND METHOD OF MANUFACTURING THE SAME

BACKGROUND OF THE INVENTION

The present invention relates to an optical connector and, more particularly, to a ferrule for an optical connector that connects optical fibers to each other.

Figure 10A:
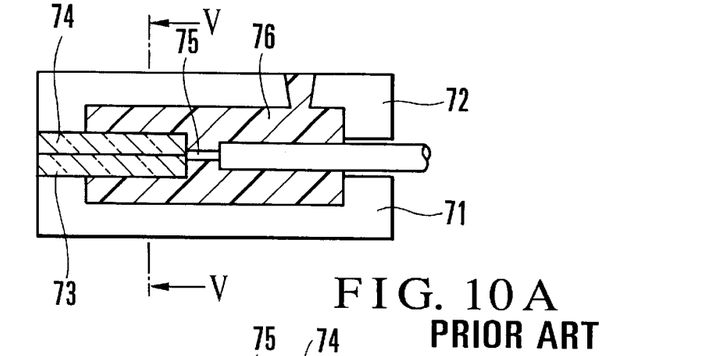
FIG. 10A is a longitudinal sectional view showing a conventional optical connector manufacturing step.

FIG. 10A shows a ferrule for an optical connector disclosed in Japanese Patent Laid-Open No. 62-276513 (Reference 1), and FIG. 10A shows this ferrule from which its upper and lower molds are removed.

Figure 10B:
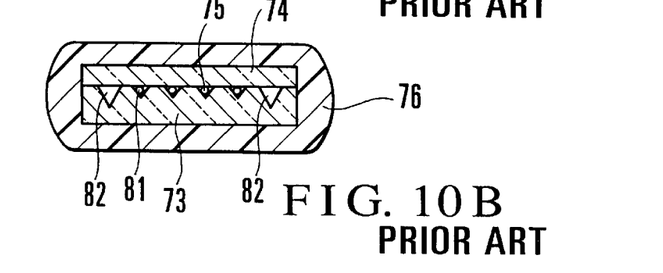
FIG. 10B is a sectional view taken along the line V—V of FIG. 10A from which the upper mold is removed.

As shown in FIG. 10B, a press plate 74 made of a silicon material is adhered to a silicon support plate 73 having an upper surface formed with V-shaped optical fiber guide grooves and guide pin grooves, thereby forming optical fiber guide holes 81 and guide pin holes 82 each having a regular-triangular cross section. Optical fibers 75 are inserted in the optical fiber guide holes 81, and closed with upper and lower molds 72 and 71, as shown in FIG. 10A. Molding with a resin 76 is performed including the optical fibers 75, thereby fixing the optical fibers 75.

Japanese Patent Laid-Open No. 62-276514 (Reference 2) also discloses a technique similar to that of FIGS. 10A and 10B.

Figure 11A:
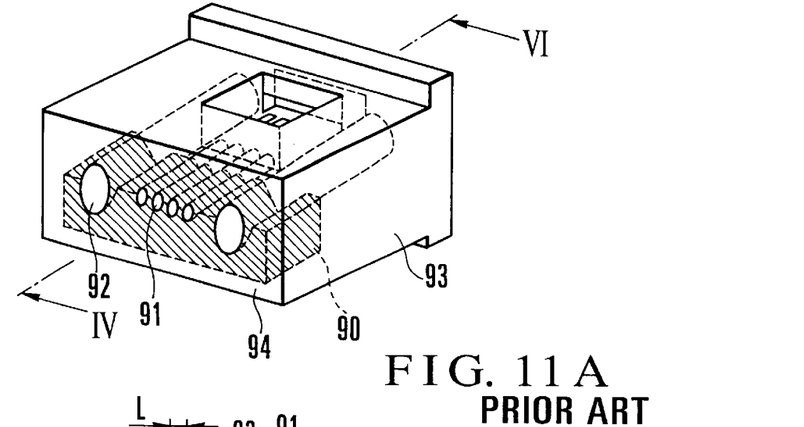
FIG. 11A is a perspective view showing another conventional optical connector manufacturing step.
Figure 11B:
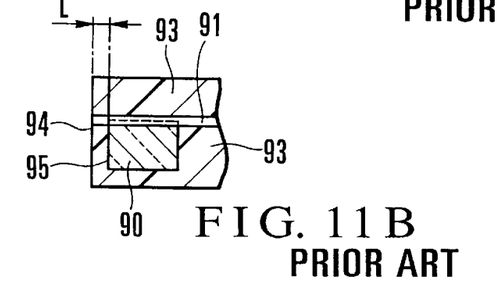
FIG. 11B is a sectional view taken along the line VI—VI of FIG. 11A from which the upper mold is removed.

FIG. 11A shows a ferrule for an optical connector disclosed in Japanese Patent Laid-Open No. 3-179406 (Reference 3), and FIG. 11B shows the main part of the same.

As shown in FIG. 11A, a ceramic support plate 90 having an upper surface formed with V-shaped optical fiber guide grooves and guide pin grooves is buried in a molded resin 93. Optical fiber guide holes 91 and guide pin holes 92 each having a circular cross section are formed in the molded resin 93 with reference to these optical fiber guide grooves and guide pin grooves.

More specifically, the optical fiber guide holes 91 and guide pin holes 92 extend from the interior of the molded resin 93 and open in a side end face 94 of the molded resin 93 through the optical fiber guide grooves and guide pin grooves of the ceramic support plate 90. As shown in FIG. 11B, the side end face 94 of the molded resin 93 is separate from a side surface 95 of the ceramic support plate 90 by a distance L.

Japanese Patent Laid-Open No. 3-179405 (Reference 4) also discloses a technique similar to that of FIGS. 11A and 11B.

In the prior art of FIGS. 10A and 10B or FIGS. 11A and 11B, the grooves are formed in the silicon support plate 73 or ceramic support plate 90, and the optical fiber guide holes 81 or 91 and the guide pin holes 82 or 92 are formed at the predetermined portions of the silicon support plate 73 or ceramic support plate 90.

In the prior art of FIGS. 10A and 10B, when optical connectors are to be connected to each other, the distal ends of the optical fibers 75 cannot be made to project by a small amount (e.g., 0.5 μm to 1 μm) from the side end face of the ferrule in order to bring the distal ends of the optical fibers 75 into direct contact with each other.

More specifically, the projecting shape of the optical fibers 75 can be obtained by subjecting the side end face of the ferrule to optical mirror surface finishing by means of buffing (buff polishing). The mirror surface finishing is also called PC (Physical Contact) polishing. According to mirror surface finishing, in order to decrease connection loss of propagation light by Fresnel reflection, the distal ends of the optical fibers 75 are made to project from the side end face of a ferrule by a small amount, and the end faces of opposing optical fibers 75 are brought into direct contact with these projecting distal ends, thereby realizing a low connection loss.

This buff polishing (PC polishing) uses a polishing medium, e.g., diamond abrasive grains. The distal ends of the optical fibers 75 cannot be made to project by a small amount unless the end face of the ferrule is formed of only a resin (plastic) softer than the optical fibers 75.

This is due to the following reason. When the difference in hardness between the side end face of the ferrule and the optical fibers 75 is small, like the conventional ferrule shown in FIGS. 10A and 10B, or when a ceramic material or silicon harder than the optical fibers 75 exists, the finished surface including the optical fibers 75 may become flat, or inversely the distal ends of the optical fibers 75 may be recessed.

In the prior art shown in FIGS. 11A and 11B, the side end face of the ferrule is formed of only the molded resin 93 to be separate from the side surface 95 of the ceramic support plate 90 by the distance L.

Generally, a coefficient of linear expansion is large in a resin and small in a ceramic material or silicon. Hence, after a high-temperature molded resin is set, if it is cooled down to room temperature (temperature of the environment where the connector is to be used), a difference in size occurs between the resin and ceramic material.

For this reason, the optical fiber guide holes 91 and guide pin holes 92 appearing in the side end face of the ferrule cannot reflect the high-precision size of the ceramic support plate 90 serving as the core pin guide member.

More specifically, due to the difference in coefficient of linear expansion between the ceramic support plate 90 and molded resin 93, the hole pitch error may occur at the resin portion corresponding to the distance L between the side surface of the ceramic support plate 90 and the side end face 94 of the molded resin 93.

In the prior art shown in FIGS. 11A and 11B, when L=0 is set, i.e., when the side surface 95 of the ceramic support plate 90 is set to coincide with the side end face of the ferrule, the distal ends of the optical fibers cannot be made to project from the side end face of the ferrule by a small amount in accordance with buffing in the same manner as in the prior art of FIGS. 10A and 10B. Accordingly, it becomes impossible to realize a low connection loss by bringing the distal ends of opposing optical fibers into direct contact with each other.

SUMMARY OF THE INVENTION

It is an object of the present invention to provide an optical connector in which optical fiber guide holes and guide pin holes can be formed at high precision, and a method of manufacturing the same.

It is another object of the present invention to provide an optical connector in which the distal ends of optical fibers can be made to project by a small amount to realize a low connection loss, and a method of manufacturing the same.

In order to achieve the above objects, according to the present invention, there is provided an optical connector comprising a core pin guide member made of a resin to guide a distal end portion of an optical fiber, a molded resin for molding the core pin guide member while exposing one end face thereof, thus constituting a ferrule main body attached to the distal end portion of the optical fiber, the one end face of the core pin guide member being flush with a distal end face of the ferrule main body, and at least one optical fiber guide hole which has an inner wall constituted by the core pin guide member and the molded resin and into which the distal end portion of the optical fiber is inserted.

DESCRIPTION OF THE PREFERRED EMBODIMENT

The present invention will be described in detail with reference to the accompanying drawings.

Figure 1:
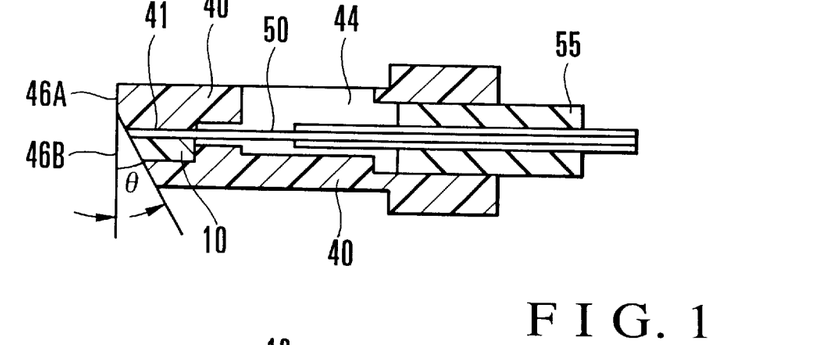
FIG. 1 is a sectional view of an optical connector according to an embodiment of the present invention.

FIG. 1 shows an optical connector according to an embodiment of the present invention, which is an MPO (Multifiber Push On) connector. Referring to FIG. 1, a core pin guide member 10 made of a resin and a molded resin (ferrule main body) 40 constitute a resin ferrule. The molded resin 40 molds the core pin guide member 10 at the distal end of the ferrule. The core pin guide member 10 and molded resin 40 are made of the same thermosetting resin. It suffices if the core pin guide member 10 and molded resin 40 are made of thermosetting resins having the same heat characteristics.

Optical fiber guide holes 41 and guide pin holes are formed at the interface between the molded resin 40 and small and large V-groove surfaces formed on the upper surface of the core pin guide member 10, as will be described later. Optical fibers 50 are inserted in the optical fiber guide holes 41 at the distal end of the ferrule, and a rubber boot 55 is pressed into the rear end portion of the ferrule. An adhesive (not shown) is introduced into the ferrule through an adhesive dropping hole 44 formed at the center of the ferrule, to fix the optical fibers 50.

The side end face of the ferrule has a buffed vertical surface 46A and a buffed tilt surface 46B, and the distal ends of the optical fibers 50 are flush with the side end face of the ferrule. The distal ends of the optical fibers 50 project from the buffed tilt surface 46B by a small amount (0.5 $\mu$m to 1 $\mu$m). The vertical surface 46A of the ferrule is a flat surface perpendicularly intersecting the optical fibers 50, and the tilt surface 46B is a flat surface inclined from the vertical surface 46A by an angle $\theta$.

In this embodiment, the tilt surface 46B is inclined from the vertical surface 46A by an angle $\theta=8°$. This tilt surface 46B is formed to realize a high reflection attenuation amount by preventing the reflected light from being set in the waveguide mode.

The distal ends of the optical fibers 50 are made to project from the tilt surface 46B by a small amount by mirror surface finishing of buff polishing. This enables direct contact, i.e., PC (Physical Contact), of the distal ends of the optical fibers 50 in connecting optical connectors, thereby realizing a low connection loss.

FIGS. 2A to 6B show a method of manufacturing the optical connector shown in FIG. 1 in the order of manufacturing steps.

Figure 2A:
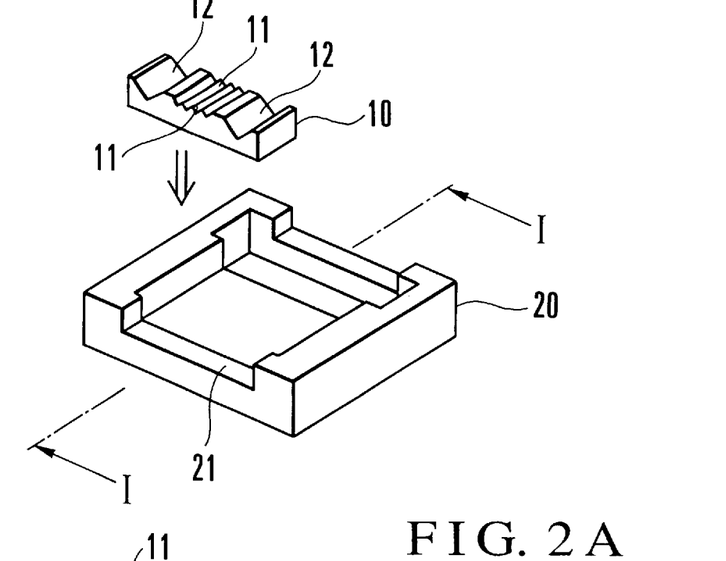
FIG. 2A is a perspective view showing the first manufacturing step of the optical connector shown in FIG. 1.
Figure 2B:
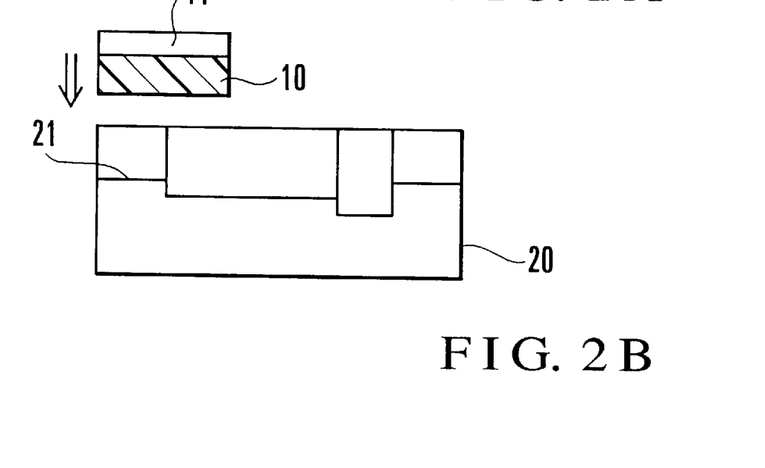
FIG. 2B is a sectional view taken along the line I—I of FIG. 2A.

As shown in FIGS. 2A and 2B, first, the core pin guide member 10 made of a thermosetting resin, e.g., an epoxy resin, is prepared. Two large V-grooves are formed as guide pin grooves 12 in the upper surface of the core pin guide member 10 to be separated from each other by a predetermined distance, and four small V-grooves are formed as optical fiber guide grooves 11 between the two guide pin grooves 12 at a constant interval.

The core pin guide member 10 is fabricated in advance and selected in accordance with size measurement of the finished products after molding, so that only a nondefective core pin guide member is used in the manufacture of the ferrule. The core pin guide member 10 is placed on a core pin guide member setting surface 21 of a lower mold 20 corresponding to the distal end of the ferrule.

Figure 3A:
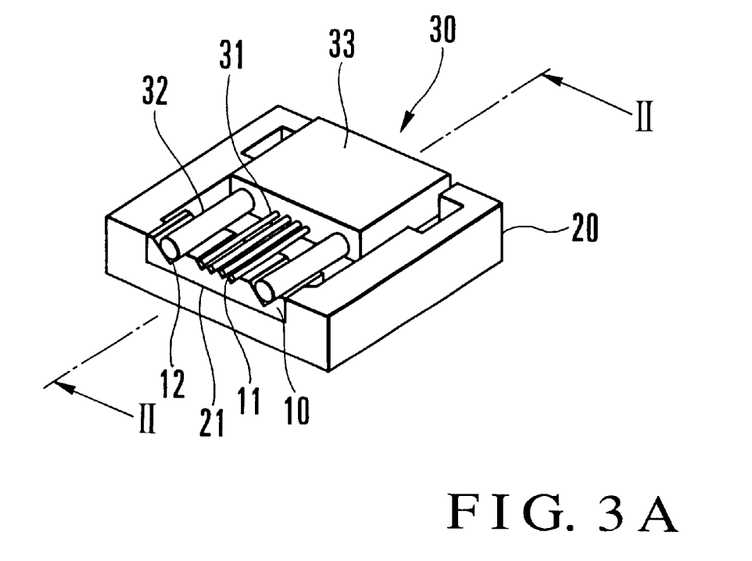
FIG. 3A is a perspective view showing the second manufacturing step of the optical connector shown in FIG. 1.
Figure 3B:
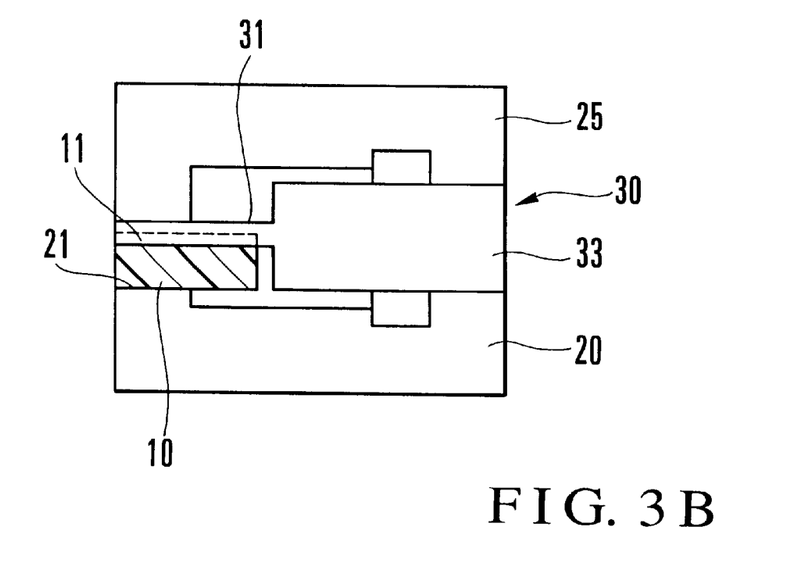
FIG. 3B is a sectional view taken along the line II—II of FIG. 3A to which an upper mold is added.

As shown in FIGS. 3A and 3B, two guide-hole core pins 32 of a core pin member 30 are placed on the guide pin grooves 12, and four optical fiber hole core pins 31 are placed on the optical fiber guide grooves 11. At this time, these pins 32 and 31 are supported by a core pin support 33 such that all of their centers are located linearly on a center line of the ferrule that extends horizontally along the side end face and are set at predetermined intervals.

An upper mold 25 is aligned with the lower mold 20, and mold closing is performed. In FIG. 3A, the upper mold 25 is not illustrated. Thereafter, a thermosetting resin, e.g., an epoxy resin, is injected into a cavity formed by the upper and lower molds 25 and 20, and is thermoset.

Figure 4A:
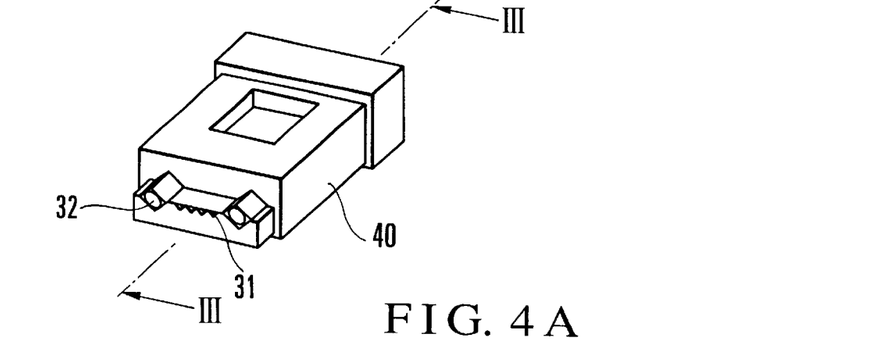
FIG. 4A is a perspective view showing the third manufacturing step of the optical connector shown in FIG. 1.
Figure 4B:
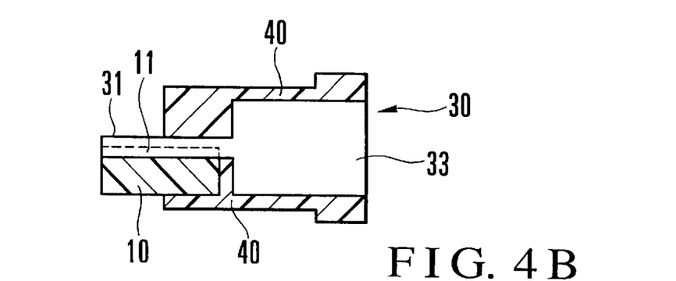
FIG. 4B is a sectional view taken along the line III—III of FIG. 4A.

As shown in FIGS. 4A and 4B, the upper and lower molds 25 and 20 are opened to release the molds from the product. Hence, the core pin guide member 10 and core pin member 30 are molded with the thermosetting resin, e.g., the molded resin 40 made of an epoxy resin.

Figure 5A:
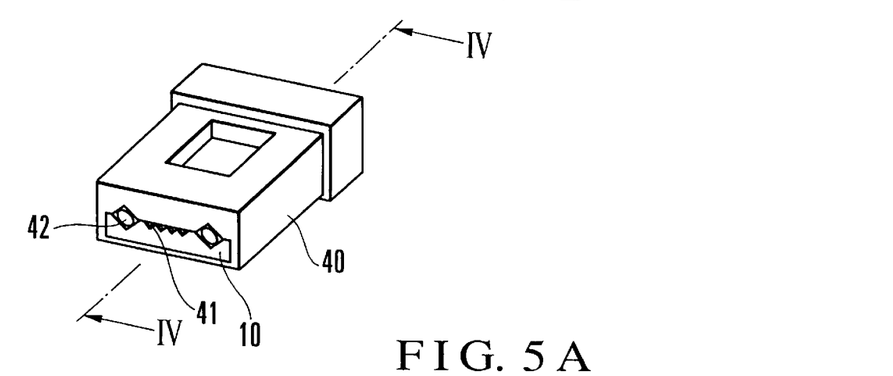
FIG. 5A is a perspective view showing the fourth manufacturing step of the optical connector shown in FIG. 1.
Figure 5B:
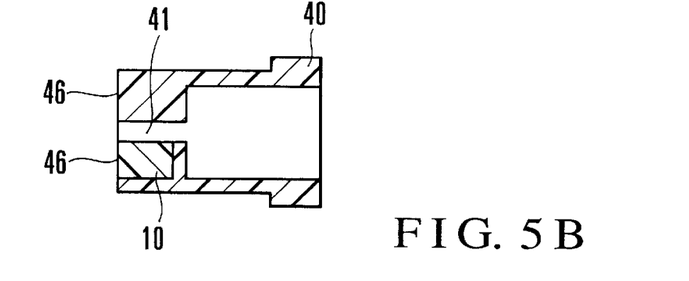
FIG. 5B is a sectional view taken along the line IV—IV of FIG. 5A.

As shown in FIGS. 5A and 5B, the core pin member 30 is pulled out from the molded resin 40, and its unnecessary portion such as the distal end portion is removed to obtain a ferrule constituted by the core pin guide member 10 and molded resin 40.

As a result, in the ferrule, the optical fiber guide holes 41 and guide pin holes 42 are formed by the core pins 31 and 32, respectively. Most of the inner wall of the optical fiber guide holes 41 is formed of the molded resin 40, and part of the inner wall that corresponds to portions where the core pins 31 are in contact with the optical fiber guide grooves 11 is constituted by the optical fiber guide grooves 11 of the core pin guide member 10.

Similarly, most of the inner wall of the guide pin holes 42 is formed of the molded resin 40, and part of the inner wall that corresponds to portions where the core pins 32 are in contact with the guide pin grooves 12 is constituted by the guide pin grooves 12 of the core pin guide member 10.

The side end face of the ferrule on the distal end side, which is constituted by the core pin guide member 10 and molded resin 40, forms a vertical surface 46 perpendicularly intersecting the optical fiber guide holes 41.

Figure 6A:
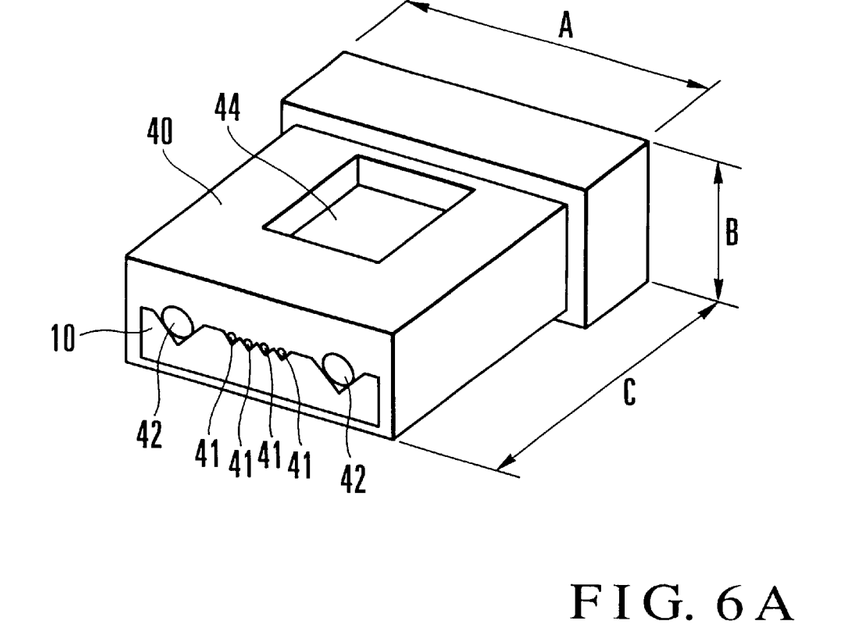
FIG. 6A is an enlarged perspective view of FIG. 5A.
Figure 6B:
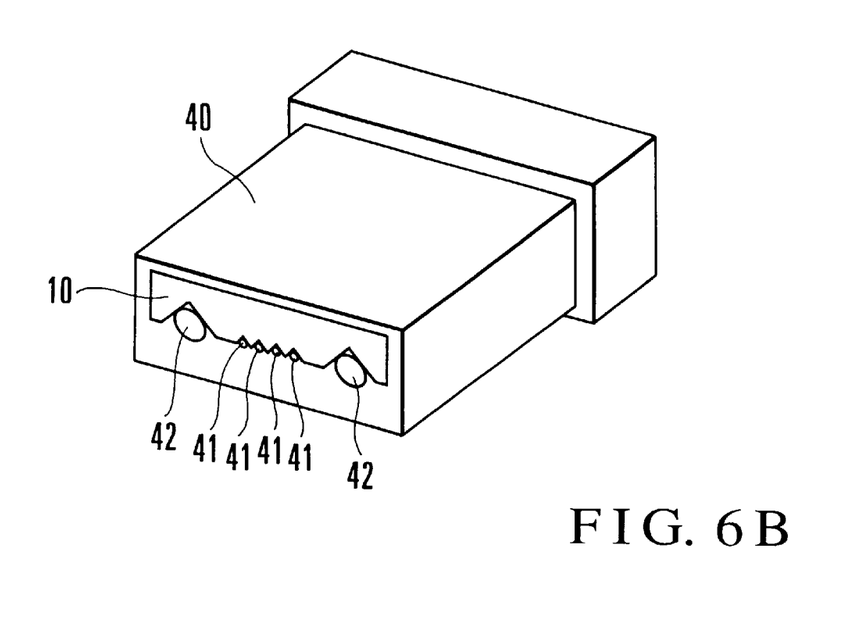
FIG. 6B is a perspective view of FIG. 6A seen from the opposite side.

FIG. 6A shows the optical connector of FIG. 5A in enlargement, and FIG. 6B shows the same from the opposite side (lower side).

Referring to FIGS. 6A and 6B, the optical fiber guide holes 41 and guide pin holes 42, the inner wall of which is constituted by the molded resin 40 and core pin guide member 10, are arranged to be axially symmetrical, i.e., point symmetrical, vertically and horizontally in the side end face of the ferrule.

In this embodiment, the diameter of each of the two guide pin holes 42 is 0.701 $\mu$m, and the diameter of each of the four optical fiber guide holes 41 arranged between the guide pin holes 42 at a constant interval is 0.127 $\mu$m. Regarding the size of the molded resin 40, A=7 mm, B=3 mm, and C=8 mm.

How to attach the ferrule fabricated in the above manner to the distal ends of the optical fibers will be described.

Figure 7:
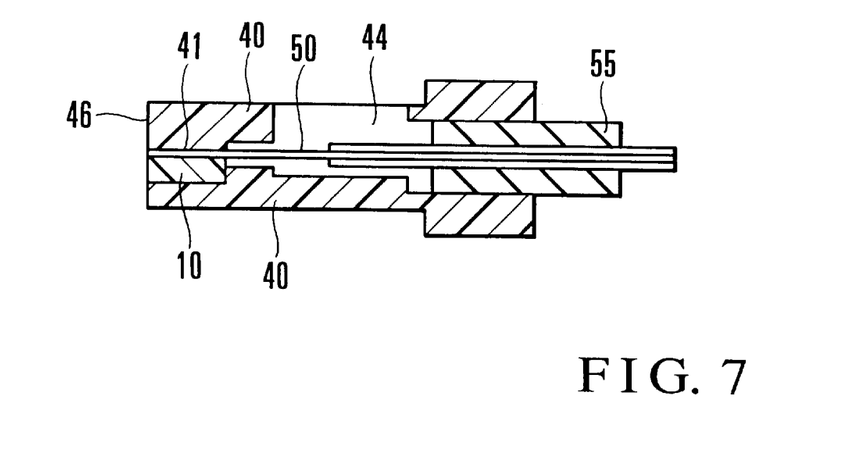
FIG. 7 is a sectional view showing the sixth manufacturing step of the optical connector shown in FIG. 1.

As shown in FIG. 7, the optical fibers 50 are inserted in the optical fiber guide holes 41 of the ferrule from the rear end side so as to reach the side end face 46, and the rubber boot 55 is fitted in the distal end of the ferrule. Subsequently, an adhesive is dropped into the ferrule through the adhesive dropping hole 44 formed in the ferrule, to fix the optical fibers 50.

When the diameter of each optical fiber guide hole 41 is 0.127 $\mu$m, the diameter of each optical fiber 50 is 0.125 $\mu$m.

Finally, the side end face of the ferrule is polished and buffed (PC polishing) to form the tilt surface 46B having a tilt angle of 8°, thereby obtaining an optical connector shown in FIG. 1. Polishing for forming the tilt surface 46B is performed through flat finishing with a hone.

Buff polishing is performed by using a polishing medium, e.g., diamond abrasive grains. Since the side end face is entirely formed of a resin (plastic) having a lower hardness than that of the optical fibers 50, the tilt surface 46B from which the distal ends of the optical fibers 50 project slightly can be formed. Therefore, the end faces of the opposing optical fibers 50 can be connected to each other by bringing them into direct contact with each other.

Figure 8:
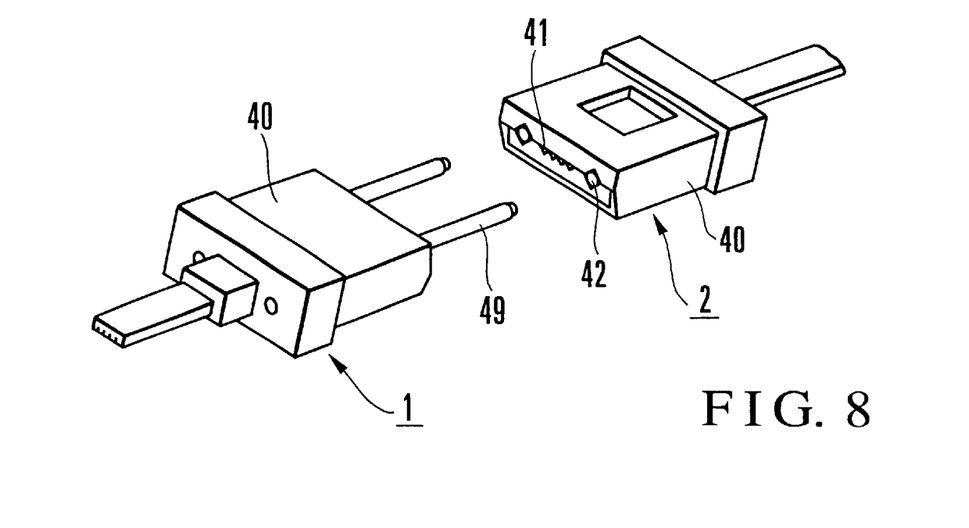
FIG. 8 shows how to connect the optical connectors each shown in FIG. 1 to each other.

FIG. 8 shows a state wherein 4-fiber optical connectors 1 and 2 having pins and pin holes of the type shown in FIG. 1 are connected to each other. As described above, when the diameter of each guide pin hole 42 is 0.701 $\mu$m, guide pins 49 each having a diameter of 0.699 $\mu$m are inserted in the guide pin holes 42 to connect the optical connectors 1 and 2 to each other.

Figure 9A:
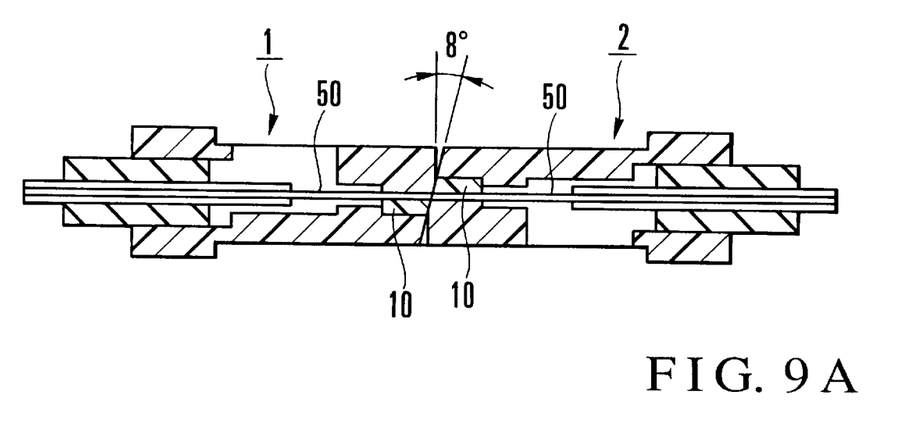
FIG. 9A is a sectional view showing a state wherein the optical connectors shown in FIG. 8 are connected to each other.
Figure 9B:
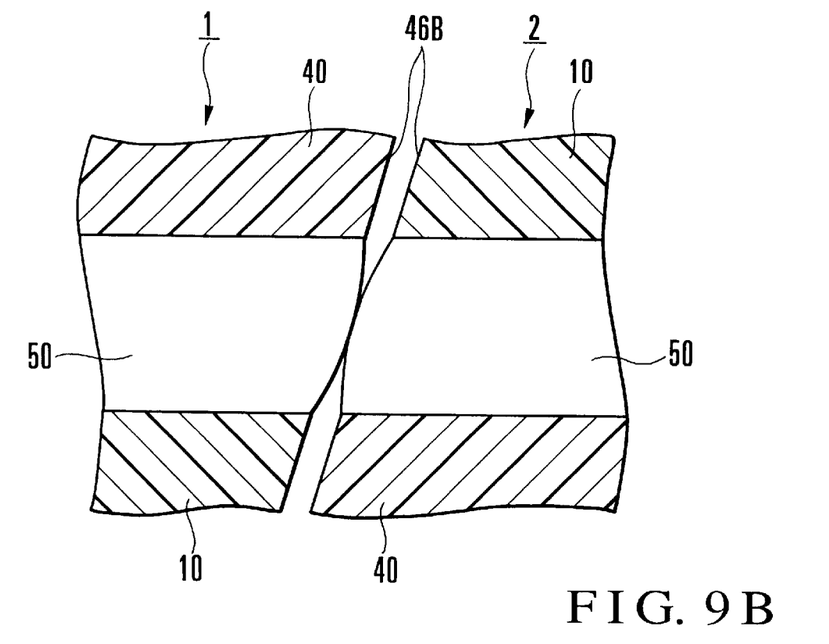
FIG. 9B is an enlarged sectional view of the main part of FIG. 9A.

FIG. 9A shows a state wherein the optical connectors shown in FIG. 8 are connected to each other, and FIG. 9B shows a PC portion of FIG. 9A in enlargement.

Even if the tilt surface 46B is formed, since the centers of the optical fiber guide holes 41 and guide pin holes 42 are located point-symmetrical in the optical connectors 1 and 2, respectively, the optical connectors 1 and 2 can be connected to each other by inverting one of the optical connectors 1 and 2 manufactured to have the same shape upside down.

As shown in FIG. 9B, since the distal ends of the optical fibers 50 project from the tilt surface 46B, which is mirror-surface polished by buff polishing, by 0.5 $\mu$m to 1 $\mu$m, the distal ends of the optical fibers 50 can be brought into direct contact (PC) with each other.

As has been described above, according to the present invention, the core pin guide member is formed of a resin, and the resin core pin guide member and the molded resin constitute the side end face of the ferrule. Therefore, the distal ends of the optical fibers can be made to project by a small amount in order to prevent misalignment between the optical fiber holes and guide pin holes and to realize a low connection loss and a high reflection attenuation amount.

What is claimed is:

1. An optical connector comprising:
   a core pin guide member made of a resin to guide a distal end portion of an optical fiber;
   a molded resin for molding said core pin guide member while exposing one end face thereof, thus forming a ferrule main body attached to the distal end portion of the optical fiber, said one end face of said core pin guide member being flush with a distal end face of said ferrule main body; and
   at least one optical fiber guide hole which has an inner wall formed by said core pin guide member and said molded resin and into which the distal end portion of the optical fiber is inserted,
   wherein said side end face is formed of a resin having a lower hardness than that of said optical fiber.

2. The optical connector according to claim 1, wherein said distal end face of said ferrule main body including said one end face of said core pin guide member is subjected to mirror surface polishing through buffing.

3. The optical connector according to claim 1, wherein said core pin guide member is made of a thermosetting resin having the same heat characteristics as those of said molded resin that forms said ferrule main body.

4. The optical connector according to claim 1, wherein said ferrule main body has, at said distal end face, a tilt surface which is inclined from a plane perpendicularly intersecting an optical axis direction of the optical fiber, and said optical fiber guide hole opens to said tilt surface of said ferrule.

5. The optical connector according to claim 1, wherein the optical fiber guide is inserted and fixed in said optical fiber guide hole such that a distal end portion thereof slightly projects from said distal end face of said ferrule main body, and
   in connection with another optical connector having the same arrangement, the distal end face of the optical fiber is brought into physical contact with a distal end face of an optical fiber of said another optical connector.

6. The optical connector according to claim 5, wherein said connector further comprises an inner wall constituted by said core pin guide member and said molded resin to define a plurality of guide pin holes into which guide pins are inserted, and said optical fiber guide hole and said guide pin holes open point-symmetrically to said distal end face of said ferrule.

7. The optical connector according to claim 6, wherein said guide pin holes comprise a pair of guide pin holes and said optical fiber guide hole comprises a plurality of optical fiber guide holes,
said optical fiber guide holes are arranged between said guide pin holes at a constant interval, and
said guide pin holes and said optical fiber guide holes are arranged such that centers thereof are located on a straight line.

8. A method of manufacturing an optical connector, comprising:
fabricating a resin core pin guide member having a guide pin groove and an optical fiber guide groove;
placing said core pin guide member at a distal end side on a lower mold;
positioning a core pin member, having a first core pin for a guide hole and a second core pin for an optical fiber hole, on said lower mold, thereby placing said first and second core pins in said guide pin groove and said optical fiber guide groove, respectively;
performing mold closing by using an upper mold, and thereafter injecting a resin into a cavity formed by said upper and lower molds and setting said resin, thereby forming a molded resin;
releasing said molded resin from said molds, and thereafter pulling out said core pin member from said molded resin, thereby fabricating a ferrule formed by said core pin guide member and said molded resin;
inserting and fixing a distal end portion of an optical fiber in an optical fiber guide hole formed by said second core pin; and
polishing a distal end face of said ferrule that opposes a distal end face of the optical fiber,
wherein said side end face is formed of a resin having a lower hardness than that of said optical fiber.

9. The method according to claim 8, wherein said core pin guide member is made of a thermosetting resin having the same characteristics as those of said molded resin.

10. The method according to claim 9, wherein said core pin guide member and said molded resin are made of an epoxy resin.

11. The method according to claim 8, wherein said polishing comprises:
forming a tilt surface on said distal end face of said ferrule that opposes the distal end face of the optical fiber, and
forming said tilt surface of said ferrule into a mirror surface by buff polishing.

12. The method according to claim 11, wherein the distal end face of the optical fiber is made to slightly project from said tilt surface of said ferrule by buff polishing, and
in connection with another optical connector having the same arrangement, the distal end face of the optical fiber is brought into physical contact with a distal end face of an optical fiber of said another optical connector.

13. The method according to claim 8, wherein said optical fiber guide hole and said guide pin holes formed by said first pins open point-symmetrically to said distal end face of said ferrule.

14. The method according to claim 13, wherein said guide pin holes comprise a pair of guide pin holes and said optical fiber guide hole comprises a plurality of optical fiber guide holes,
said optical fiber guide holes are arranged between said guide pin holes at a constant interval, and
said guide pin holes and said optical fiber guide holes are arranged such that centers thereof are located on a straight line.

15. The optical connector as claimed in claim 1, wherein said distal end face of said ferrule main body comprises a buffed vertical surface and a buffed tilt surface, and
wherein said distal ends of said optical fibers are flush with said side end face of said ferrule.

16. The optical connector as claimed in claim 15, wherein said distal ends of said optical fibers project from said buffed tilt surface,
wherein said buffed vertical surface comprises a flat surface perpendicularly intersecting said optical fibers, and
wherein said buffed tilted surface comprises a flat surface inclined inward towards a ferrule main body from the vertical surface.

17. The optical connector as claimed in claim 15, wherein said buffed tilt surface is formed to provide high reflection attenuation without the reflected light being set in a waveguide mode.

18. The method as claimed in claim 11, wherein said distal end face of said ferrule comprises a vertical surface perpendicularly intersecting said optical fibers, and
wherein said vertical surface comprises a flat surface.

19. The method as claimed in claim 11, wherein said tilt surface comprises a flat surface inclined inward towards a ferrule main body from the vertical surface.

20. The method as claimed in claim 11, wherein said tilt surface is formed to provide high reflection attenuation without the reflected light being set in a waveguide mode.

21. The method as claimed in claim 8, wherein after said polishing the optical fiber projects from a surface of said ferrule.

22. An optical connector comprising:
a core pin guide member made of a resin to guide a distal end portion of an optical fiber;
a molded resin for molding said core pin guide member while exposing one end face thereof, thus forming a ferrule main body attached to the distal end portion of the optical fiber, said one end face of said core pin guide member being flush with a distal end face of said ferrule main body; and
at least one optical fiber guide hole which has an inner wall formed by said core pin guide member and said molded resin and into which the distal end portion of the optical fiber is inserted,
wherein said distal end face of said ferrule main body including said one end face of said core pin guide member is subjected to mirror surface polishing through buffing,
wherein said core pin guide member is made of a thermosetting resin having the same heat characteristics as those of said molded resin that forms said ferrule main body,
wherein said ferrule main body has, at said distal end face, a tilt surface which is inclined from a plane perpendicularly intersecting an optical axis direction of the optical fiber, and said optical fiber guide hole opens to said tilt surface of said ferrule, wherein the optical fiber guide is inserted and fixed in said optical fiber guide hole such that a distal end portion thereof slightly projects from said distal end face of said ferrule main body, and in connection with another optical connector having the same arrangement, the distal end face of the optical fiber is brought into physical contact with a distal end face of an optical fiber of said another optical connector.

* * * * *